United States Patent [19]

Elliott et al.

[11] 4,333,876
[45] Jun. 8, 1982

[54] PROCESS FOR THE PREPARATION OF METAL DIPHTHALOCYANINES

[75] Inventors: George Elliott, Sandon; Brian W. Ely, Braintree, both of England

[73] Assignee: The Marconi Company Limited, Chelmsford, England

[21] Appl. No.: 208,118

[22] Filed: Nov. 18, 1980

[30] Foreign Application Priority Data

Nov. 23, 1979 [GB] United Kingdom ................ 7940543

[51] Int. Cl.$^3$ ............................................. C09B 47/04
[52] U.S. Cl. ........................... 260/245.73; 260/245.86
[58] Field of Search ...................................... 260/314.5

[56] References Cited

U.S. PATENT DOCUMENTS 3,027,391 3/1962 Frigerio .................... 260/314.5 OR

OTHER PUBLICATIONS

Moser et al., Phthalocyanine Compounds, pp. 104 to 107, 125-127, Reinhold Publishing Corp., NY. (1963).

Primary Examiner—Richard Raymond
Attorney, Agent, or Firm—Spencer & Kaye

[57] ABSTRACT

The diphthalocyanines of certain tri- and tetravalent metals, especially those of the empirical general formulae $(PC)_2 \cdot H \cdot M^{III}$ (Ia) or $(PC)_2 \cdot M^{IV}$ (Ib) (wherein $M^{III}$ and $M^{IV}$ represent respectively the tri- and tetravalent metal, and "PC" represents the phthalocyanine ring system) are well-known for their semiconductor and/or electrochromic properties. They are presently prepared by a process in which an organic derivative of the metal (an acetate, for example) is reacted, at about 300° C. in a sealed tube, with an appropriate phthalonitrile. This process is itself unsatisfactory, and the invention provides a novel preparative process, process technique and application method. Thus, the inventive process involves reacting the metal (in the form of a complex with a 2,4-diketone, preferably acetyl acetone) with a large (about 100%) molar excess (based on the metal) of the phthalocyanine (preferably phthalocyanine itself) to give the desired diphthalocyanine, while the inventive technique places the reagents together as two layers in contact, the phthalocyanine layer being above the metal diketone complex layer, and slowly heats the whole to a temperature above that at which the diketone complex vaporizes. The inventive method prepares the metal diphthalocyanine using the inventive process and technique, and places the surface upon which the compound is to be deposited within the reaction vessel adjacent the reagents so that the formed diphthalocyanine is condensed directly thereon.

12 Claims, 2 Drawing Figures (II)

(III)

PROCESS FOR THE PREPARATION OF METAL DIPHTHALOCYANINES

BACKGROUND OF THE INVENTION

1. Field of the Invention

This invention concerns phthalocyanines, and relates in particular to processes for the preparation of certain metal phthalocyanines which may be of use as semiconductor and/or electrochromic materials.

2. Description of the Prior Art

Phthalocyanines—also referred to as benzoporphyrins—have been well-known for many years as powerful colouring agents useful in the preparation of dyestuffs. Most of these materials, whether mono- or diphthalocyanines, and both substituted and unsubstituted, are in the form of complexes with metals. Certain of these complexes—expecially the diphthalocyanines of tri- and tetravalent metals, principally the rare earth metals (the 15 elements from lanthanum to lutetium; particularly europium, terbium and lutetium), and associated metals such as yttrium—are well-known for their semiconductor and/or electrochromic properties. A material is said to be electrochromic if it changes colour in response to changes in the magnitude or direction of the electric potential applied across it; lutetium diphthalocyanine, a material to which a considerable amount of study has been devoted, can be persuaded (suitably arranged in an appropriate electrolytic cell) to display the colours from violet and deep blue, through various shades of green, to orange and red. Materials such as this have obvious possibilities in colour display systems of many sorts.

The diphthalocyanines are of the empirical general formulae

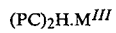  (Ia)

or

  (Ib)

wherein $M^{III}$ and $M^{IV}$ represent respectively the tri- and tetravalent metal, and "PC" represents the phthalocyanine ring system. Phthalocyanine itself is shown in full in Formula II of FIG. 1. H—as normal—represents hydrogen.

The structure of the compounds Ia and/or Ib is such that a single metal atom is "sandwiched" between two opposing phthalocyanine ring systems, and Formula III of FIG. 2 shows a simplified, general structure for complexes of this kind where M is the metal, "BI" represents the individual benzoisoindole ring systems making up the phthalocyanine system, and for clarity the bonds joining the two phthalocyanine systems to the metal atom have been omitted.

Metal diphthalocyanines are presently prepared by a process in which an organic derivative of the metal (an acetate, for example) is reacted, at about 300° C. in a sealed tube, with an appropriate phthalonitrile. This process is itself unsatisfactory, not the least because the reaction product is a mixture including various by-products, and the necessary purification (by chromatography) is difficult and time-consuming. The invention seeks to provide a novel process for the preparation of metal diphthalocyanines, which process avoids this difficulty.

Another problem connected with metal diphthalocyanines concerns their mode of use. The compounds have to be applied to a surface, and in practice the only convenient way to effect this is by vapour deposition. Unfortunately, because of their high molecular weight the compounds are extremely difficult to evaporate and then deposit as a thin film, and even where evaporation can be achieved the temperatures required—of the order of 500° C. and higher—are such as to result in not inconsiderable decomposition. The invention seeks to provide a novel method for the thin film application of metal diphthalocyanines, which method avoids these difficulties.

SUMMARY OF THE INVENTION

In one aspect, therefore, this invention provides a process for the preparation of a metal diphthalocyanine of the general formula Ia or Ib, in which the metal in the form of a complex with a 2,4-diketone is reacted with a large molar excess (based on the metal) of the phthalocyanine to give the desired diphthalocyanine.

The metal may be any appropriate tri- or tetravalent metal. For the preparation of a useful semiconductor and/or electrochromic diphthalocyanine, however, it is most conveniently a rare earth, for example neodymium (Nd), samarium (Sm), europium (Eu), gadolinium (Gd), terbium (Tb), dysprosium (Ds), holmium (Ho), erbium (Er), ytterbium (Yb), and lutetium (Lu), especially europium, terbium and lutetium. To a considerable extent the choice made depends upon the exact properties—thus, colour—required, and upon cost.

The metal is employed in the form of a complex with a 2,4-diketone. The nature of this diketone does not seem especially important, save that it be an active diketone which is readily formed and most preferably volatile below 300° C. It may conveniently be a substituted or unsubstituted aliphatic or arylaliphatic diketone, examples being 1,1,1-trifluroacetyl acetone, 4,4,4-trifluoro-1-(2-thienyl)-1,3-butane dione, acetyl acetone and benzoyl acetone. Acetyl acetone is presently favoured.

These metal diketone complexes are in general known. They may be prepared by the direct reaction of a metal salt (a mineral acid salt such as the chloride or sulphate) with the diketone in slightly acid aqueous solution (pH 4 to 6).

The phthalocyanine is most preferably phthalocyanine itself (the presence of substituent groups in the benzoisoindole rings making up the basic phthalocyanine system causes as yet unpredictable changes in the semiconductor and electrochromic effects).

The metal diketone complex is reacted with a large molar excess (based on the metal) of the phthalocyanine. A typical such excess is 100%—that is, twice that amount of phthalocyanine required for the desired reaction with the metal. This large excess ensures the presence of sufficient phthalocyanine for the reaction (despite some side reactions), and at the same time cuts down on the quantity of by-products formed.

The reaction is most conveniently carried out in a sealed vessel under vacuum, with heating to a temperature of from 300° to 400° C. However, instead of physically mixing the reagents it is very much preferred to employ a technique whereby the reagents are placed together as two layers in contact, the phthalocyanine layer being above the metal diketone complex layer, and the whole is slowly heated (from below) to a temperature above that at which the diketone complex vapourises and preferably near that at which the phthalocyanine vapourises. As the diketone complex vapourises it passes through the phthalocyanine layer. The actual reaction seems to take place during the transition and at least in part in the combined vapour region immediately above the phthalocyanine layer (and thus appears to occur at least partly in the vapour phase). The formed diphthalocyanine is effectively removed from the reaction "medium" by condensation onto the walls of the vessel.

Using this technique the reactive portion of the diketone complex—the vapour—is in contact with a massive excess of phthalocyanine, while the diphthalocyanine product is removed from the system. In this way the formed product is, so far as can be ascertained, of significantly improved purity as compared with the analogous material the immediate product of the conventional metal acetate/phthalonitrile process; indeed, the purity is so high that the inventive product can be used as it is, without further purification.

The purity of the product of the inventive process technique is so high that, rather than recover it from the walls of the reaction vessel and then re-evaporate it so as to deposit it where required, it is possible to effect the deposition upon the desired surface in situ during the reaction. In another aspect, therefore, this invention provides a method for the thin-film application of a metal diphthalocyanine of the general formula Ia or Ib, in which the compound itself is prepared using the inventive process and preparative technique, and the surface upon which the compound is to be deposited is placed within the reaction vessel adjacent the reagents so that the formed diphthalocyanine is condensed directly thereon.

The invention extends, of course, to a metal diphthalocyanine of the general formula Ia or Ib whenever prepared by a process, and/or a preparative technique, as described and claimed herein, and to a surface coated with such a compound (especially when using the inventive application method).

DETAILED DESCRIPTION

Figure 1:
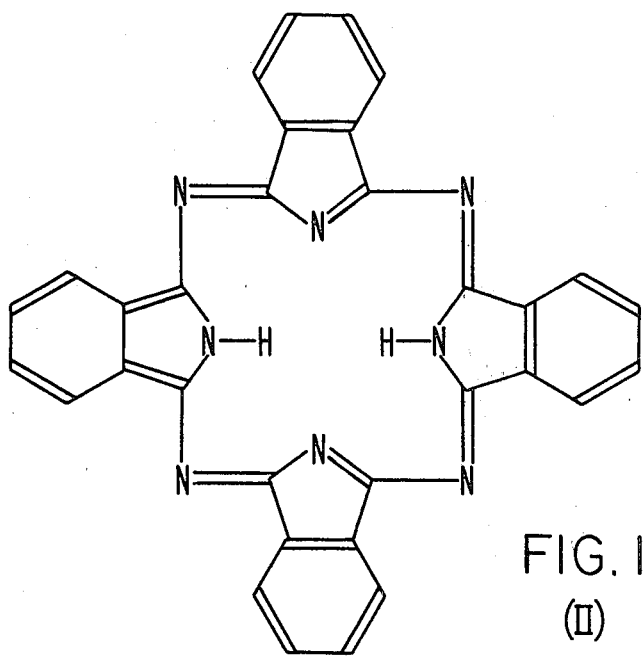
Figure 2:
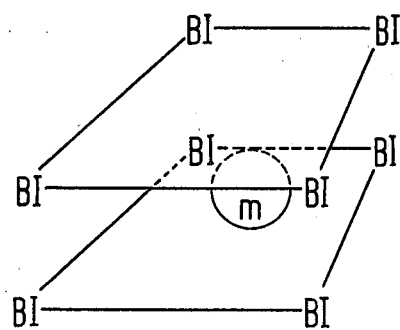

The following Example is now given, though only by way of illustration, to show details of various embodiments of the invention.

Example: The formation of a surface coating of lutetium diphthalocyanine upon a glass substrate (A) Preparation of lutetium acetyl acetone complex 4 g. of lutetium chloride were dissolved in 20 ml. water, together with the addition of about 10 wt% (2 g.) sodium chloride (to improve product extraction by a "salting out" effect), and 5 g. acetyl acetone dissolved in 30 ml chloroform were added thereto. The pH was checked, and adjusted (if necessary) by addition of HCl or ammonia to from 4 to 6.

Upon agitation, with gentle heating to 40°–50° C., the lutetium acetylacetonate complex was quickly formed. It was extracted from the mixture in the chloroform layer, and by evaporation of the solvent the metal complex was obtained as a crystalline solid.

(B) Preparation of the diphthalocyanine, and deposition upon the substrate.

0.01 g. of the formed lutetium acetyl acetonate complex was placed in a vitreous carbon crucible, and carefully covered with a layer of 0.1 g. of pure phthalocyanine (the proportions were adjusted so that there was a relatively large excess of phthalocyanine, compared with the weight of lutetium; in this case this meant using about 10 parts by weight of phthalocyanine to 1 part by weight of the lutetium acetylacetonate—a 100% molar excess). The crucible was placed in a vacuum chamber, and the glass substrate to be coated set up a few centimeters away. The chamber was then pumped down to $10^{-6}$ Torr or better, and the crucible was gradually heated up to 300° C. by direct resistive heating.

The lutetium acetyl acetone complex vapourised at a relatively low temperature, and then reacted directly with the phthalocyanine to form the required lutetium diphthalocyanine (the more stable compound). The reaction appeared to take place at least partly in the vapour phase, and a satisfactory deposit of the diphthalocyanine was obtained on the glass substrate surface.

The formed lutetium diphthalocyanine product was identified by its characteristic absorption spectra(as compared with that of the metal-free phthalocyanine starting material).

We claim:

1. A process for the preparation of a metal diphthalocyanine of the general formula $(PC)_2H.M^{III}$ or $(PC)_2.M^{IV}$ wherein $M^{III}$ and $M^{IV}$ represent, respectively, a tri- and tetravalent metal, and PC represents the phthalocyanine ring system, comprising reacting the metal in the form of a complex with a 2,4-diketone with a large molar excess, based on the metal, of a phthalocyanine, to give the desired metal diphthalocyanine.

2. A process as claimed in claim 1, wherein the metal is europium, terbium or lutetium.

3. A process as claimed in claim 1, wherein the metal is reacted in the form of a complex with a substituted or unsubstituted aliphatic or arylaliphatic 2,4-diketone.

4. A process as claimed in claim 3, wherein the 2,4-diketone is acetyl acetone.

5. A process as claimed in claim 1, wherein the phthalocyanine is phthalocyanine itself.

6. A process as claimed in claim 1, in which the large molar excess of the phthalocyanine is 100%.

7. A process as claimed in claim 1, wherein the complex and the phthalocyanine are placed together as two layers in contact, the phthalocyanine layer being above the metal diketone complex layer, and the layers are slowly heated to a temperature above that at which the diketone complex vapourises.

8. A process as claimed in claim 7, wherein the layers are heated to a temperature near that at which the phthalocyanine vapourises.

9. A process as claimed in claim 7, wherein the reaction is carried out in a reaction vessel and the metal diphthalocyanine is deposited as a thin film on a surface which is placed within the reaction vessel adjacent to the layers, so that the formed metal diphthalocyanine is condensed directly on said surface.

10. A process as claimed in claim 1, wherein the metal is a rare earth metal.

11. A process as claimed in claim 2, wherein the metal is lutetium.

12. A process as claimed in claim 1, wherein the reaction is carried out in a sealed vessel under vacuum at 300° to 400° C.

* * * * *